(12) United States Patent
Takagi et al.

(10) Patent No.: US 7,274,953 B2
(45) Date of Patent: Sep. 25, 2007

(54) PORTABLE TELEPHONE WITH REDUCED SPECIFIC ABSORPTION RATE AND IMPROVED EFFICIENCY

(75) Inventors: Kazuhisa Takagi, Fukushima (JP); Yuko Furukawa, Fukushima (JP); Yuji Koyamashita, Fukushima (JP); Shigeru Kusunoki, Fukushima (JP); Sohji Tsuchiya, Fukushima (JP)

(73) Assignee: Kabushiki Kaisha Fine Rubber Kenkyuusho, Saitama (JP)

( * ) Notice: Subject to any disclaimer, the term of this patent is extended or adjusted under 35 U.S.C. 154(b) by 247 days.

(21) Appl. No.: 10/792,789

(22) Filed: Mar. 5, 2004

(65) Prior Publication Data

US 2005/0075150 A1    Apr. 7, 2005

(30) Foreign Application Priority Data

Oct. 7, 2003    (JP) ............................ 2003-348690

(51) Int. Cl.
*H04M 1/00*    (2006.01)
(52) U.S. Cl. .............................. 455/575.2; 455/575.2; 455/575.5
(58) Field of Classification Search ............ 455/575.2, 455/575.5, 90; 252/500
See application file for complete search history.

(56) References Cited

U.S. PATENT DOCUMENTS

| | | | |
|---|---|---|---|
| 4,948,922 A | * | 8/1990 | Varadan et al. ............. 174/353 |
| 6,031,731 A | | 2/2000 | Suesada et al. |
| 6,615,026 B1 | * | 9/2003 | Wong ....................... 455/575.5 |
| 2001/0053673 A1 | | 12/2001 | Toyoda et al. |
| 2003/0107025 A1 | * | 6/2003 | Okayama et al. ........... 252/500 |

FOREIGN PATENT DOCUMENTS

JP    2002-151881    5/2002

OTHER PUBLICATIONS

Jianqing Wang et al., Realization of Low SAR in Human Head by Surface Current Suppression on Portable Telephone, Technical Report of IEICE EMCJ98-45 Sep. 1998, Dept of Electrical and Computer Engineering, Nagoya Institute of Technology Gokiso-cho, Showa-ku, Nagoya 466-8555, no month listed.
Osamu Harhimoto et al., Numerical Discussion on Decrement of Human Body SAR by Means of Shielding Material, Aug. 1996,.vol. J 79-B II No. 8 pp. 486-491 1996, no month listed.
Eiji Hanuki et al., Investigations on Antenna Radiation Efficiency Improvement of Cellular Phones With a Low Loss Magnetic Plate, Technical Relport of IEICE Jul. 2000.
Yusuke Watanabe et al., A Study on Improvement of Antenna Radiation Efficiency for Cellular Phones by a High Permeability Magnetic Sheet, Issed in 2003, no month listed.

* cited by examiner

*Primary Examiner*—Lester G. Kincaid
*Assistant Examiner*—Charles Shedrick
(74) *Attorney, Agent, or Firm*—Young & Thompson

(57) ABSTRACT

A dielectric sheet is attached to the inner surface of the portable telephone housing. The dielectric sheet extends in the area between the user's head and a whip antenna of the portable telephone. The real part and the imaginary part of the relative dielectric constant of the dielectric sheet is properly selected such that the dielectric sheet can reduce SAR (Specific Absorption Rate) and improve antenna efficiency.

11 Claims, 8 Drawing Sheets

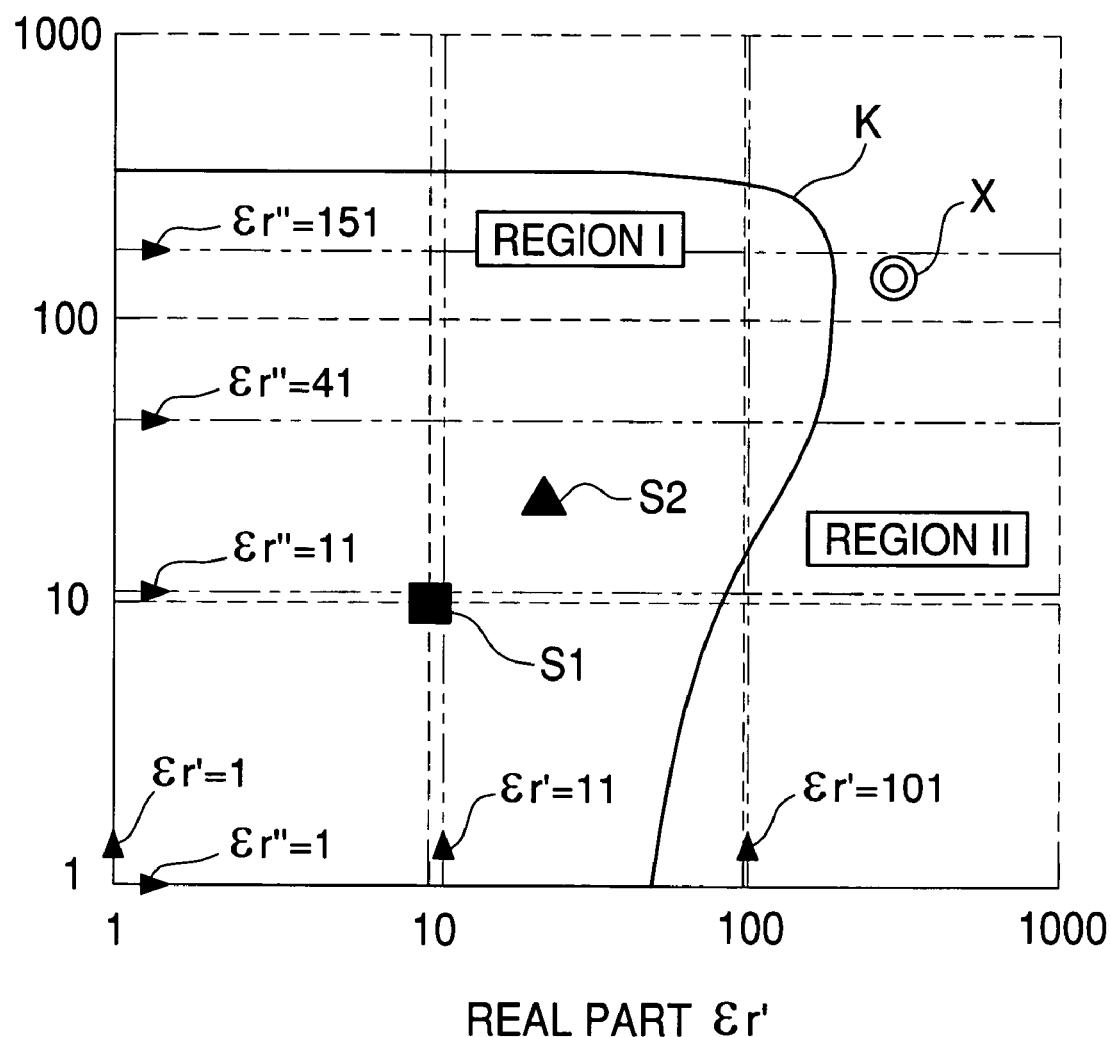

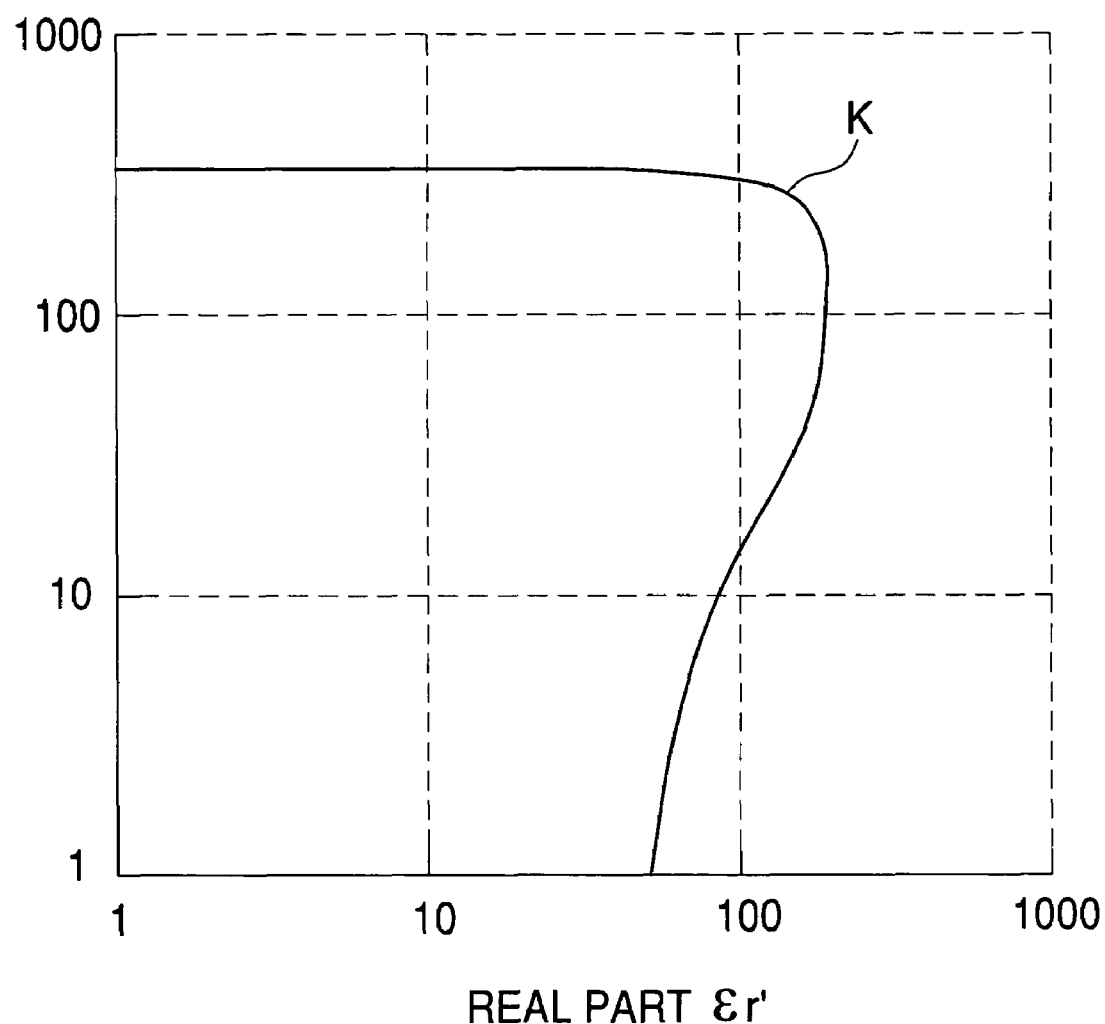

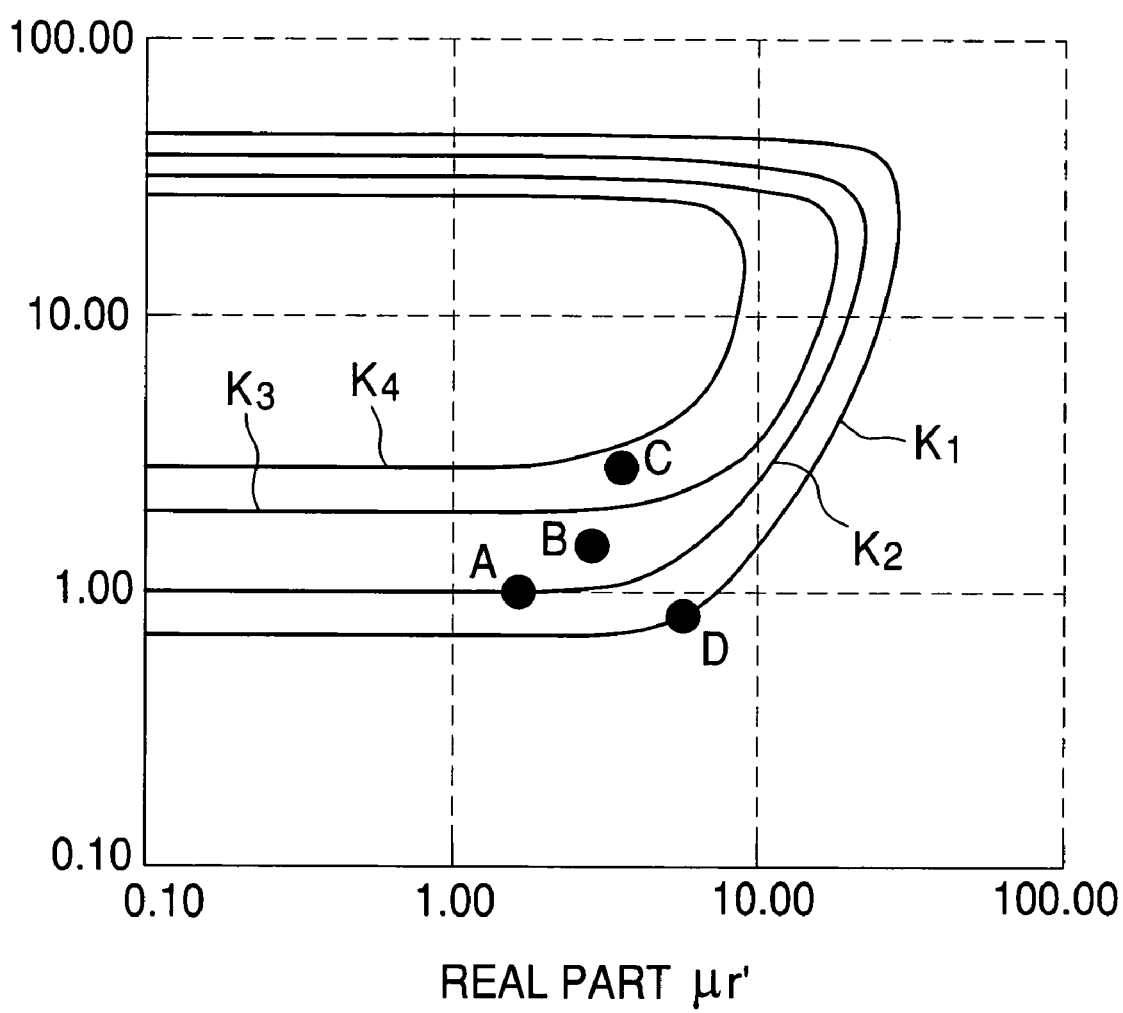

__PORTABLE TELEPHONE WITH REDUCED SPECIFIC ABSORPTION RATE AND IMPROVED EFFICIENCY__

BACKGROUND OF THE INVENTION

1. Field of the Invention

The present invention relates to a portable telephone. In particular, the present invention relates to a portable telephone that can decrease influence of electromagnetic wave on a human body and improve antenna efficiency.

2. Description of the Related Art

With widespread use of the portable telephone, improvement of antenna efficiency and various influence of electromagnetic wave in operation are discussed. Especially, in terms of influence on human body, it is necessary to evaluate SAR (Specific Absorption Rate). SAR stands for an amount of electromagnetic energy absorbed per unit time to tissues of unit mass by exposing a human body to electromagnetic wave. As for an apparatus used in the vicinity of a human head, such as the portable telephone, localized SAR is applied for evaluation in Japan. The localized SAR is the average SAR over 10 g of certain portion of localized human body, and there is guidance in Japan that the localized SAR should not exceed 2 W/kg. Thus, it is necessary to design the portable telephone such that the localized SAR of electromagnetic wave from the portable telephone (800 MHz to 900 MHz), used in the vicinity of the human head, is smaller than 2 W/kg.

The article, Wang et al. "Realization of Low SAR in Human Head by Surface Current Suppression on Portable Telephone", technical report of IEICE (EMCJ98-45), published 1998, pp. 35-40, (hereinafter referred to as "reference 1") describes that gluing a ferrite sheet with the thickness of 2.5 mm to the head side of the portable telephone housing can reduce the surface current density in the metal body so as to reduce the localized SAR. In addition, the article, Hashimoto et al. "Numerical Discussion on Decrement of Human Body SAR by Means of Shielding Material", IEICE Vol. J79-B-II No. 8, published 08/1996, pp. 486-491 (reference 2) describes the analysis by use of a phantom model and mentions that it is effective in reducing SAR to shield electromagnetic wave by placing a dielectrics with the thickness of 30 mm between the human head and the portable telephone housing.

In order to improve antenna efficiency while reducing SAR, the article, Hankui et al. "Investigations on Antenna Radiation Efficiency Improvement of Cellular Phones with a Low-Loss Magnetic Plate", technical report of IEICE (EMCJ2001-31), published 2001, pp. 7-12, (reference 3) describes that a low-magnetic loss magnetic plate with the thickness of 5 mm is effective in improving antenna efficiency, and describes that SAR is reduced by more than 10% with such magnetic plate. Moreover, the article, Watanabe et al., "A Study on Improvement of Antenna Radiation Efficiency for Cellular Phones by a High Permeability Magnetic Sheet", IEEJ Transactions on Fundamentals and Materials, Abstract of 2002 conference, page 121, (reference 4) describes the analysis, by use of FDTD (Finite difference Time Domain) method, that antenna efficiency is improved by use of the above magnetic plate with the thickness of 0.8 mm.

In U.S. Pat. No. 6,031,731, the antenna efficiency is improved by placing a non-directional chip antenna in a position on the circuit substrate that is separated from and faced to a conductive reflection plate, and by connecting the chip antenna to a ground pattern of the circuit substrate. In addition, incorporating an electromagnetic absorption body, such as a magnetic loss material, in the portable telephone is effective in reducing SAR and preventing influence of unnecessary wave on surroundings (see United States Patent Publication No. 2001/0053763 and JP-A No. 2002-151881).

As described above, various steps are taken for the purpose of improving communication condition of the portable telephone. The above references, however, are not sufficient in consideration of the practice of the portable telephone to require miniaturization while reducing SAR and improving antenna efficiency. For instance, the ferrite and dielectric plates with 2.5 mm to 30 mm in thickness described in the above references 1-3 are not practical in incorporating into the portable telephone while keeping the size and the weight thereof. In the example described in the reference 3, since an electromagnetic absorption body to reduce SAR causes reduction in antenna efficiency, the low-loss magnetics in the portable telephone improves the antenna efficiency by merely 14.7% and reduces the SAR by merely about 10%.

Although the above reference 4 describes that the high permeability magnetic sheet with 0.8 mm in thickness is effective in improving the antenna efficiency, the result is based on a calculation by use of a specific analysis model. This reference does not analyze the influence of other physical value, such as the relative dielectric constant (>1.0) original to the magnetics. Moreover, this reference does not suggest the practical examples.

U.S. Pat. No. 6,031,731 describes the technique to improve the directionality and reduce SAR, but the effect of SAR reduction is merely about 10%. Although U.S. Patent Publication No. 2001/0053763 aims for SAR reduction by interaction between the conductive layer and the wave absorption body with the thickness of 1-4 mm, it is not clear that the physical characteristics of the wave absorption body relates to SAR reduction. Such uncertainty is also applied to the above reference 4. In addition, JP-A 2002/151881 describes the components of the wave absorption body, but is not clear that which physical characteristic of the wave absorption body is effective in absorbing unnecessary wave. Moreover, JP-A 2002/151881 does not mention the specific structure to reduce SAR while keeping the antenna efficiency.

SUMMARY OF THE INVENTION

An object of the present invention is to provide a portable telephone that can improve largely the communication condition by reducing SAR and improving the antenna efficiency, without sacrificing the weight and the size.

To achieve the above object, it is advantageous to utilize a dielectrics rather than a magnetics. And the present invention is achieved based on the idea that particular combination of the real part $\epsilon_r'$ and the imaginary part $\epsilon_r''$ of the relative dielectric constant $\epsilon_r$ ($=\epsilon_r'-j\epsilon_r''$) is effective in controlling the antenna efficiency of the portable telephone, that is, the reflectivity, transmittance and absorption rate to electromagnetic wave. The dielectrics according to the present invention, which has the thickness of 1 mm or lower, is apart from the antenna of the portable telephone. Moreover, the dielectrics according to the present invention is characterized in that the relative dielectric constant $\epsilon_r$ is selected such that the combination of the real part $\epsilon_r'$ and the imaginary part $\epsilon_r''$ is outside of the characteristic line K shown in FIG. 4.

In consideration of applying the dielectrics to a light and compact portable telephone, it is preferable to keep the thickness of the dielectric 1 mm or less. But ordinary dielectrics under such requirement makes it difficult to achieve the object of the invention. Thus, the relative dielectric constant of the dielectrics is analyzed under the condition that the thickness of the dielectrics is 1 mm, and that the frequency of the electromagnetic wave from the portable phone is 900 MHz. A characteristic graph is prepared in order to evaluate the antenna efficiency in association with the amount of electromagnetic wave absorbed in a human body (SAR). The antenna efficiency is calculated based on the reflectivity, transmittance and absorption rate of the electromagnetic wave to the dielectrics. The relative dielectric constant $\epsilon_r$ is selected such that the combination of the real part $\epsilon_r'$ and the imaginary part $\epsilon_r''$ is outside of the characteristic line K defined in the characteristic graph. The relative dielectric constant may be controlled by adjusting the properties of a base material, such as the kinds, amount, grain diameter and aspect ratio of the dielectric material and conductive material to be added to the base material. A resin, a rubber, an elastmer and the like, may be utilized as the base material of the dielectrics.

The characteristic line K may be a continuous curve to form a closed region between the horizontal axis (real part axis) and the vertical axis (imaginary part axis). The coordinates (combination of the real part $\epsilon_r'$ and the imaginary part $\epsilon_r''$) on the characteristic line K are listed in the following Table 1.

smaller and lighter. In addition, since the SAR relative value is less than 1, and the AEFF relative value is more than 1, the dielectrics according to the present invention is suitable for improving SAR and antenna efficiency so that the communication condition of the portable telephone is improved. Moreover, the dielectric according to the present invention is practical since the dielectric constant is easily controlled by adding a dielectric material and a conductive material to the base material, such as a resin, a rubber and an elastmer.

BRIEF DESCRIPTION OF THE DRAWINGS

The above objects and advantages of the present invention will become easily understood by one of ordinary skill in the art when the following detailed description would be read in connection with the accompanying drawings, in which:

FIGS. 3 and 4 are characteristic graphs to show antenna efficiency in association with real and imaginary parts of the relative dielectric constant;

TABLE 1

| | $\epsilon_r'$ | | | | | | | | | | | | | | | | | |
|---|---|---|---|---|---|---|---|---|---|---|---|---|---|---|---|---|---|---|
| | 1 | 11 | 21 | 31 | 41 | 51 | 61 | 71 | 81 | 91 | 101 | 111 | 121 | 131 | 141 | 151 | 161 | 171 |
| $\epsilon_r''$ | 341 | 341 | 341 | 341 | 341 | 341 | 331 | 331 | 331 | 321 | 321 | 311 | 301 | 291 | 291 | 371 | 261 | 251 |
| | $\epsilon_r'$ | | | | | | | | | | | | | | | | | |
| | 181 | 191 | 191 | 191 | 191 | 191 | 191 | 191 | 181 | 171 | 161 | 151 | 141 | 131 | 121 | 91 | 51 | |
| $\epsilon_r''$ | 221 | 191 | 181 | 171 | 161 | 151 | 141 | 131 | 91 | 71 | 61 | 51 | 41 | 31 | 21 | 11 | 1 | |

The above described dielectrics is preferably located near the antenna and in the mouthpiece or earpiece portion side with respect to the antenna. The dielectrics may be attached to the inner surface of the housing to contain the mouthpiece or earpiece portion. It is also possible to place the dielectrics between the antenna and a user's body at the time when the portable telephone is used by the user.

The measured SAR and the antenna efficiency under the condition without such dielectrics are respectively defined as SAR(0) and AEFF(0). The measured SAR and antenna efficiency under the condition with such dielectrics are respectively defined as SAR(A) and AEFF(A). The method for measuring SAR and antenna efficiency will be described later. In addition, the SAR relative value and the AEFF relative value are respectively defined as SAR(A)/SAR(0) and AEFF(A)/AEFF(0). The dielectrics according to the present invention preferably satisfies the conditions:

(SAR relative value)<1

(AEFF relative value)>1

Figure 6A:
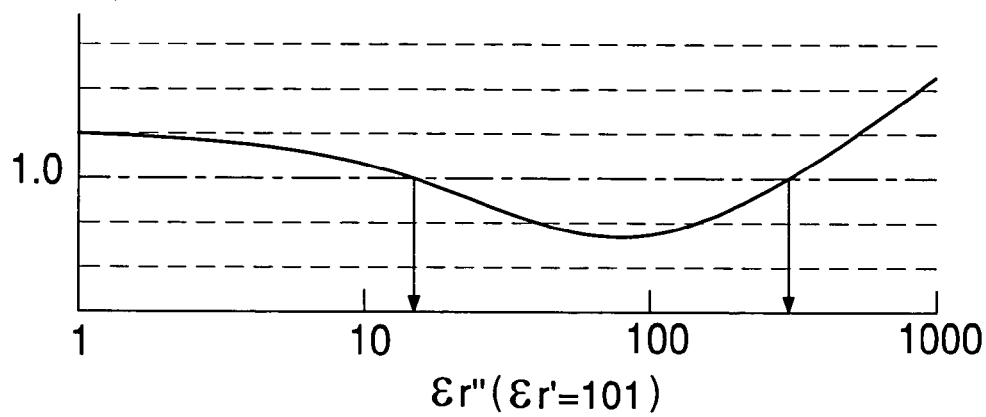
Figure 6B:
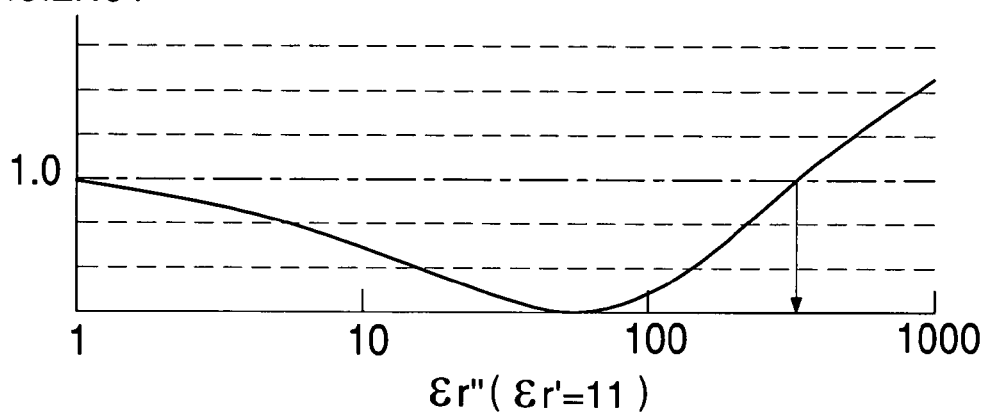
Figure 6C:
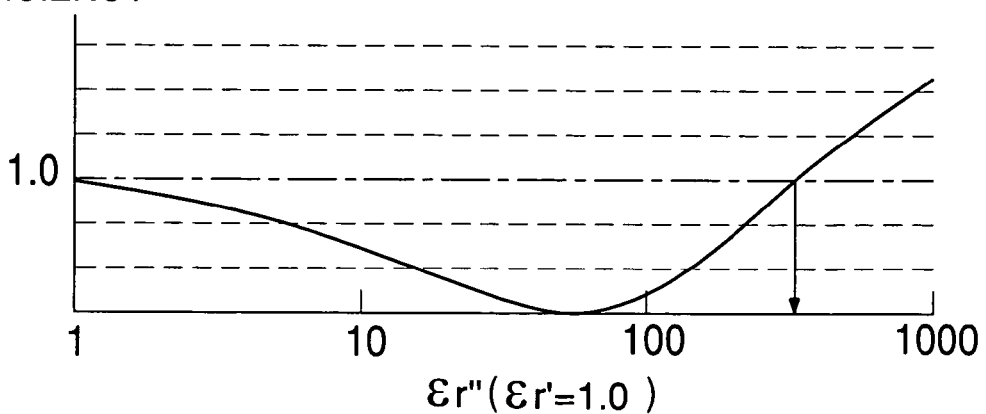
Figure 8:
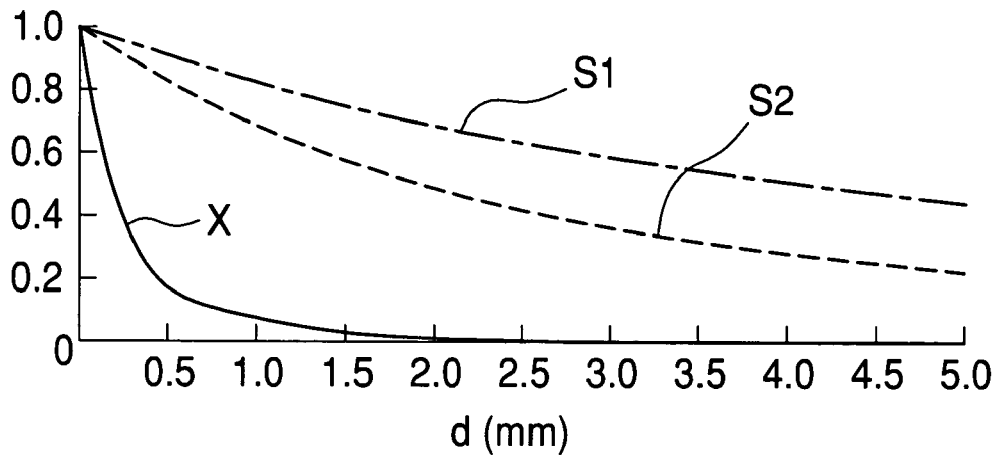
Figure 9:
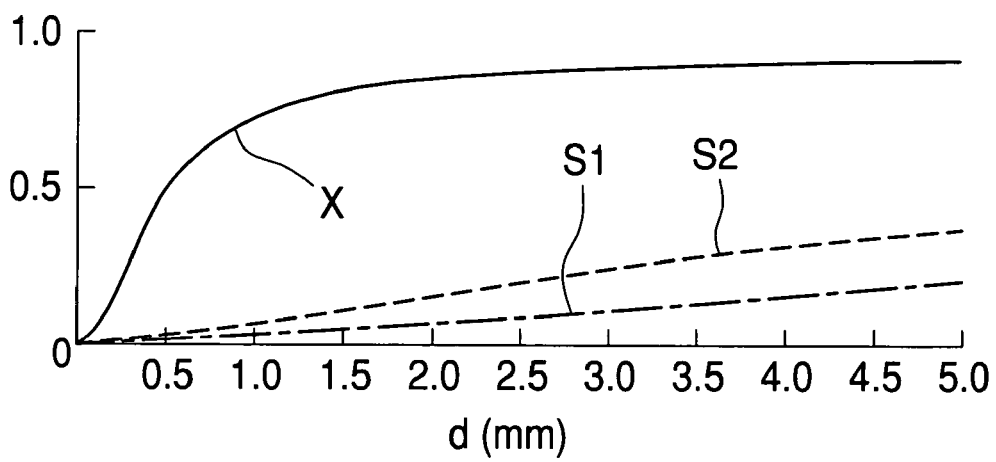
Figure 10:
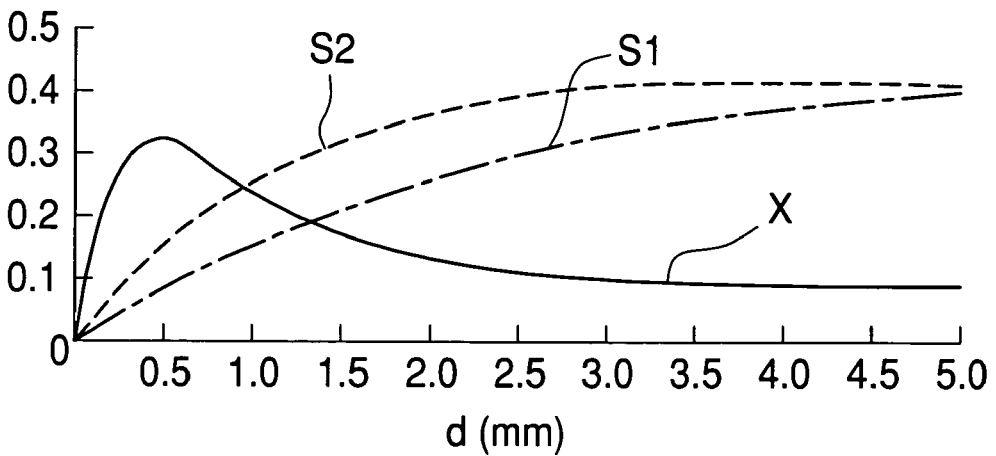

According to the present invention that utilizes sheet-type dielectrics having the unique characteristic in the relative dielectric constant, it is possible to reduce SAR and improve antenna efficiency. Since the thickness of the dielectrics is kept 1 mm or less, it is possible to improve the communication condition while making the portable telephone FIGS. 5A, 5B, 5C and 5D are graphs showing AEFF relative value of dielectrics in function of the real part of the relative dielectric constant;

FIGS. 6A, 6B and 6C are graphs showing AEFF relative value of dielectrics in function of the imaginary part of the relative dielectric constant;

FIG. 7 is a characteristic diagram to show antenna efficiency of the prior art, in association with relative magnetic constant;

FIG. 8 is a graph showing the transmittance of the dielectrics in function of the thickness thereof;

FIG. 9 is a graph showing the reflectivity of the dielectrics in function of the thickness thereof; and FIG. 10 is a graph showing the absorption rate of the dielectrics in function of the thickness thereof.

PREFERRED EMBODIMENTS OF THE INVENTION

Figure 1:
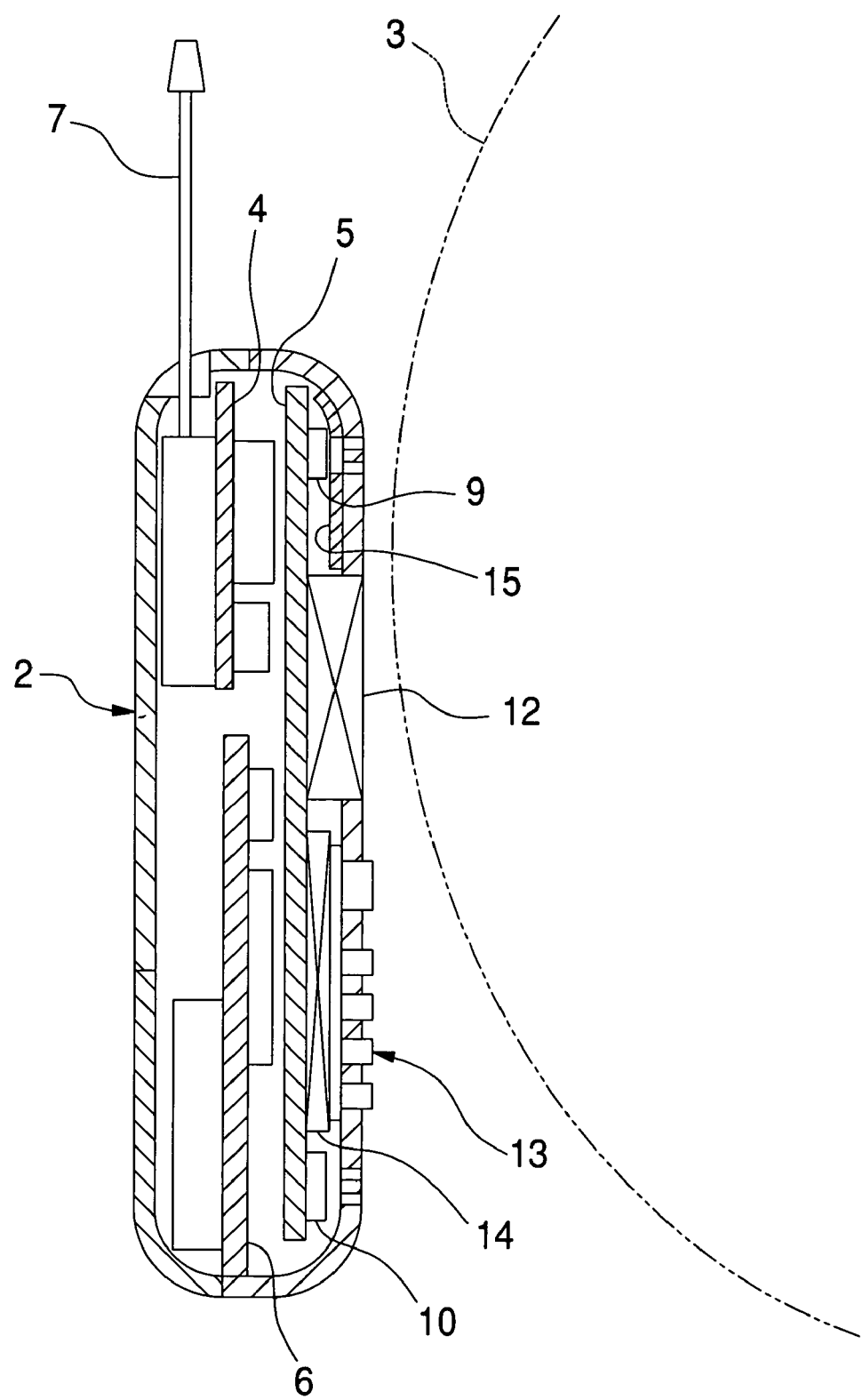
FIG. 1 is a partially schematic cross section of a portable telephone according to the embodiment of the present invention.

FIG. 1 shows the schematic structure of one embodiment of the portable telephone according to the present invention. The portable telephone 2 in operation is held in the vicinity of the user's head 3. The portable telephone 2 is provided with a communication circuit board 4, a main circuit board and a power supply circuit board 6, each of which includes a plurality of circuit elements, IC chip and memory chip. The communication circuit 4 is provided with a whip antenna 7 that is pulled out of the housing of the portable telephone 2 in operation, and is pushed into the housing when the portable telephone 2 is not used.

A speaker 9 and a microphone 10, incorporated in the main circuit board 5, enable to output and input sounds through speaker and mouthpiece holes formed in the housing of the portable telephone 2. The main circuit board 5 is provided with a liquid crystal display (LCD) panel 12, plural input buttons 13 and so forth. The LCD panel 12 displays various information to the user. In response to pressing the input buttons 13, the input signals corresponding to the input button 13 are sent via a keypad device 14 to the control circuit on the main circuit board 5. The power supply circuit 6 connects a rechargeable buttery to supply power to the various circuit of the portable telephone 2. Since the function and the operation of these circuits and elements of the portable telephone 2 are the same as those in a conventional portable telephone, the detailed explanation for these circuits and elements are omitted.

In an inner surface of the housing in the side closer to the user's head 3, a dielectric sheet 15 is attached for the purpose of reducing SAR and improving antenna efficiency. The dielectric sheet 15 is a flexible dielectrics with the thickness of 1 mm, and extended parallel to the longitudinal direction of the whip antenna 7 such that the dielectric sheet 15 shields the area between the communication circuit board 4 and the user's head 3. The dielectric sheet 15 works as the electromagnetic wave controller to reflect, absorb and transmit electromagnetic wave emitted from the portable telephone 2.

In this embodiment, silicon rubber is used as the base material of the dielectric sheet 15. The dielectric sheet 15 is prepared by mixing additives with the base material. The additive includes conductive carbon powder and carbon fibers with the length of several hundred micrometers. The relative dielectric constant $\epsilon_r$ ($=\epsilon_r'-j\epsilon_r''$) of the dielectric sheet 15 has the real part $\beta_r'$ of 288 and the imaginary part $\beta_r''$ of 124. The combination of the real part and the imaginary part of the dielectric sheet 15 corresponds to the point X (288, 124) in the double logarithm charts shown in FIG. 3. The point X is located in the outer region of the characteristic line K. The dielectric sheet 15 with such dielectric constant makes it possible to reduce SAR and emit electromagnetic wave without causing much loss.

Figure 2:
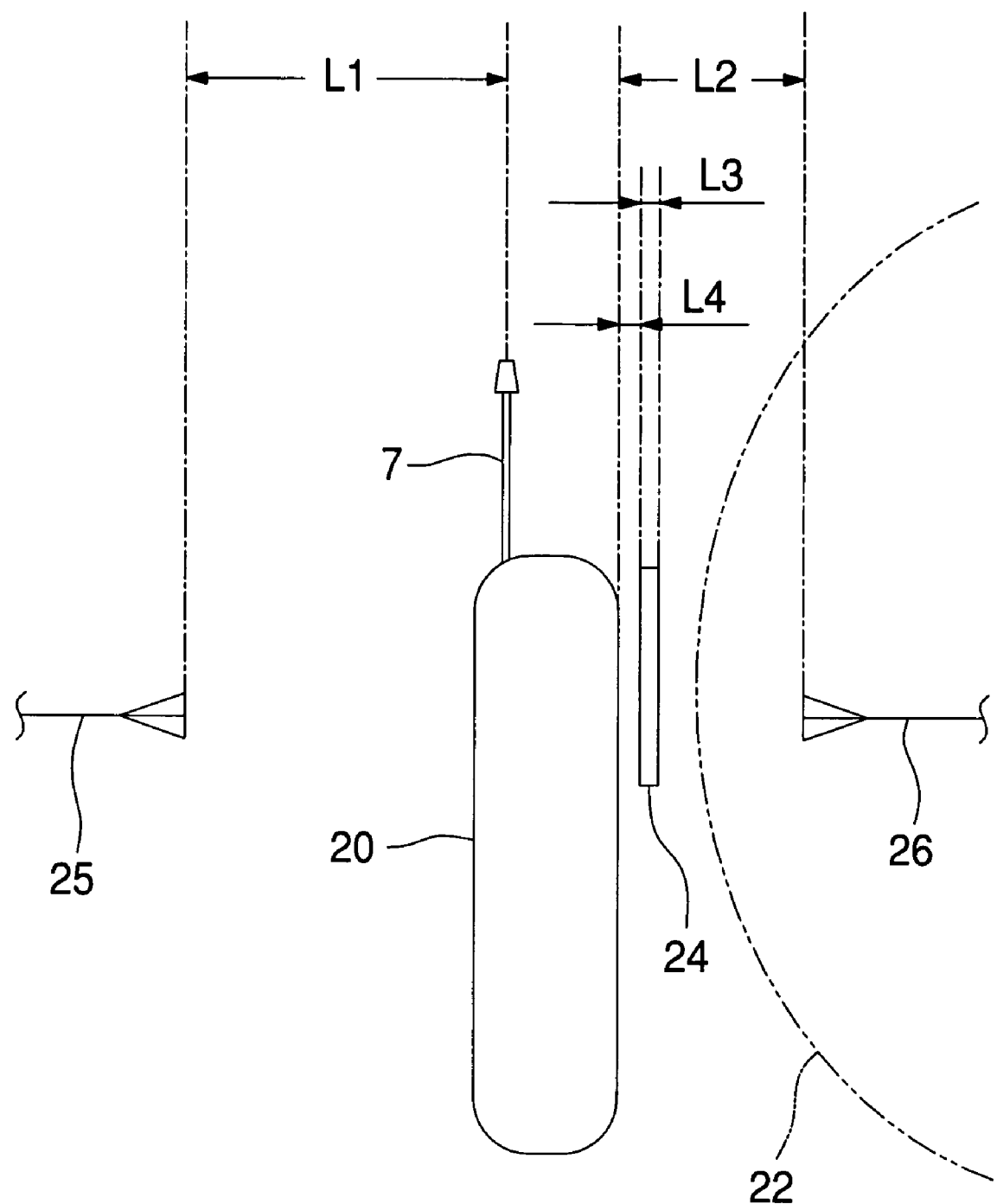
FIG. 2 is an explanatory view of an experiment system for measurement of electromagnetic wave.
Figure 5A:
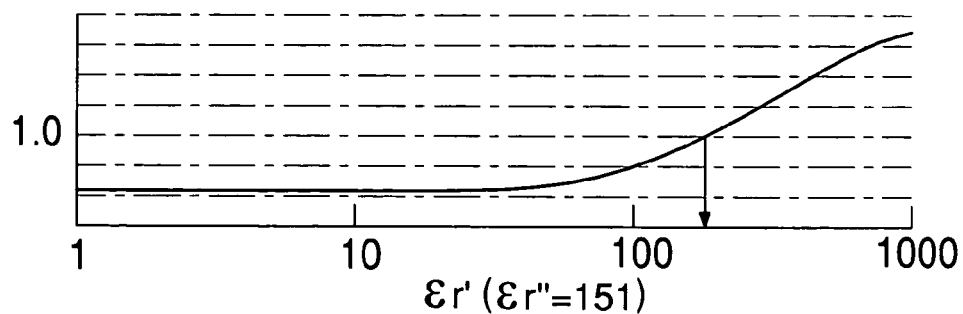
Figure 5B:
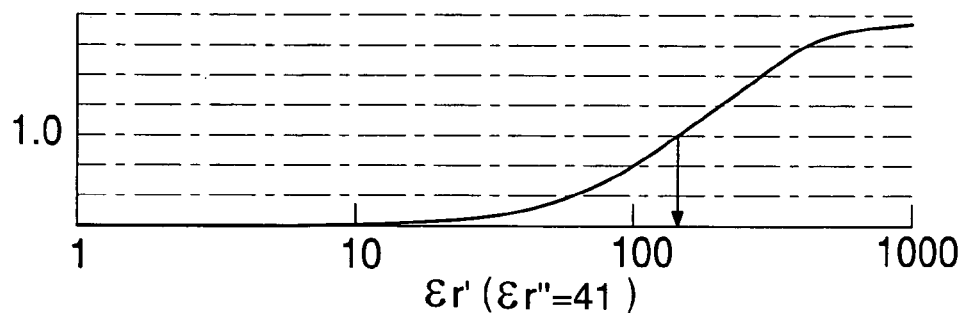
Figure 5C:
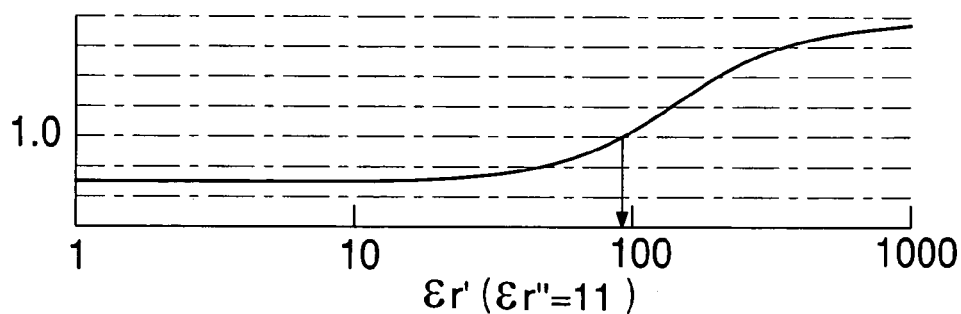
Figure 5D:
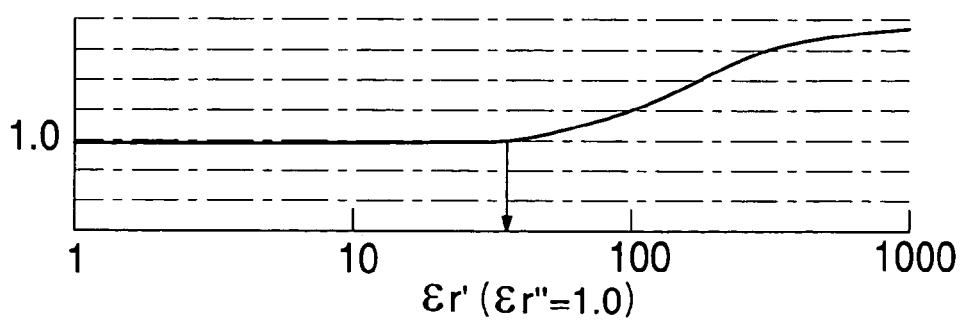

The effect of the dielectric sheet 15 is examined by use of an experimental system shown in FIG. 2. In the experimental system shown in FIG. 2, a plate-shaped dielectric sample 24 is placed between a conventional portable telephone 20 without such dielectric sheet and a phantom model 22. The phantom model 22 has the same characteristics to the electromagnetic wave (relative dielectric constant: 43.6, conductivity: 0.91 S/m) as a human body. Antenna 25, 26 are respectively placed on both sides of the experimental system to measure electromagnetic energy.

The antenna 25 for measuring the electromagnetic energy to be emitted from the portable telephone 20 is placed in the opposite side of the phantom model 22 with respect the whip antenna 7. The antenna 25 is apart from the whip antenna 7 by the distance L1 (100 mm). The measured value of the antenna 25 corresponds to the antenna efficiency. The other antenna 26 for measuring electromagnetic energy to be received through the dielectric sample 24 is apart from the phantom model 22 side housing by the distance L2 (25 mm). The measured value of the antenna 26 corresponds to SAR. The thickness L3 of the dielectric sample 24 is 1 mm, and the distance L4 between the housing of the portable telephone 20 and the dielectric sample 24 is 0.5 mm. The dielectric sample 24 has the length of 150 mm and the width of 150 mm.

The real part $\epsilon_r'$ and the imaginary part $\epsilon_r''$ of the dielectric sample 24 is 288 and 124, respectively. Under these conditions, the portable telephone 20 emits electromagnetic wave with the frequency of 900 MHz to measure the antenna efficiency and the SAR. Compared to the system with no dielectric sample, it is found that the antenna efficiency (electromagnetic energy measured by the antenna 25) increases by at least more than 10% when the dielectric sample 24 is provided. Moreover, the SAR (electromagnetic energy measured by the antenna 26) reduces by more than 50%. In that case, the SAR relative value becomes 0.5, and the AEFF relative value becomes 1.1, and thus such dielectric sample 24 is effective in achieving the object of the present invention. Note that the relative dielectric constant $\epsilon_r$ is measured by use of HP8507 that is manufactured by Hewlett-Packard Development Company, L.P.

The characteristic line K in FIG. 3 is used in order to determine the practical value of relative dielectric constant. The characteristic line K is determined by the combination of the real part $\beta_r'$ and the imaginary part $\beta_r''$ of the dielectric sample 24 with the thickness of 1 mm, which satisfies the condition that the SAR relative value is 1.0 and the AEFF relative value is 1.0. Several coordinates on the characteristic line K is listed in the table shown above. Note that FIG. 4 is the simplified version of FIG. 3, and the characteristic line K in FIG. 4 is the same as that shown in FIG. 3.

The coordinates on the characteristic line K is determined by the following. First, the imaginary part $\epsilon_r''$ of the relative dielectric constant is fixed as 151, 41, 11, 1 (indicated in the graph of FIG. 3). Then, the AEFF relative value is plotted in function of the real part $\epsilon_r'$ of the relative dielectric constant, as shown in FIGS. 5A-5D. The combination of the real part $\epsilon_r'$ and the imaginary part $\epsilon_r''$ corresponding to the characteristic line K is obtained such that the AEFF relative value takes 1.0. Similarly, the AEFF relative value is plotted in function of the imaginary part $\epsilon_r''$ of the relative dielectric constant while fixing the real part $\epsilon_r'$ as 101, 11, 1, as shown in FIGS. 6A-6C. The combination of the real part $\epsilon_r'$ and the imaginary part $\epsilon_r''$ corresponding to the characteristic line K is obtained such that the AEFF relative value takes 1.0.

The graphs of FIGS. 5A-5D show that when the imaginary part $\epsilon_r''$ is fixed, the antenna efficiency increases after the real part $\epsilon_r'$ of the relative dielectric constant exceeds 10.0. In general, the reflectivity of electromagnetic wave increases as the real part of the relative dielectric constant increases. Large real part is effective in reducing SAR and improving antenna efficiency.

In addition, as shown in the graphs of FIGS. 6A-6C, when the real part $\epsilon_r'$ of relative dielectric constant is fixed, the antenna efficiency once decreases to take a minimal value, and then increase as the imaginary part $\epsilon_r''$ of the relative dielectric constant increases. Large imaginary part is advantageous in reducing SAR due to increase in absorption rate of electromagnetic wave. If the imaginary part $\epsilon_r''$ is in the middle of the graph shown in FIG. 3, it is not preferable due to the decrease in antenna efficiency.

The characteristic line K makes a closed region I in the graph shown in FIG. 3, and the dielectric sheet 15 according to the present invention has the relative dielectric constant whose real part and the imaginary part is positioned in the outer region II of the characteristic line K. On the other hand, the samples S1, S2 described in the reference 2 has the relative dielectric constant of 10-j10, 20-j20, respectively. The coordinates of the real part and the imaginary part corresponding to the samples S1, S2 belong to the region I. Thus, the dielectric characteristics of the samples S1, S2 are largely different from that of the dielectric sheet 15.

In order to reduce SAR and improve the antenna efficiency by use of the above samples S1, S2 of the reference 2, it is required to increase the reflectivity to electromagnetic wave by increasing the thickness of the samples. Thus, it is difficult to incorporate the samples S1, S2 into a recent compact and light portable telephone.

The region I in FIG. 3 corresponds to the area with low real part and low imaginary part. The region II includes the areas with (1) high real part and low imaginary part, (2) low real part and high imaginary part, and (3) high real/imaginary parts. It is possible to make the relative dielectric constant in the region (1) by adjusting the aspect ratio of high dielectric materials, such as the barium titanate and PZT (lead zirconate titanete), to be added to the base material. The dielectric sheet 15 with the relative dielectric constant in the region (1) does not exhibit high surface reflection, but the internal absorption is low. The dielectric sheet 15 with the relative dielectric constant in the region (2) is realized by adjusting the aspect ratio and the grain diameter of the conductive materials, such as carbons and metals, and by adjusting the mixture ratio of the conductive materials and the base material. It is possible to realize the dielectric sheet 15 with the relative dielectric constant in the region (3) by adding high conductive material, such as metals and carbons, into the material having the relative dielectric constant in the region (1). The dielectric sheet 15 in the regions (2), (3) has high reflectivity and internal absorption of electromagnetic wave.

The above reference 3 refers to a low-loss magnetic plate in order to achieve the same purpose of the present invention. Four samples A-D are evaluated in the reference 3. In the event of utilizing the low-loss magnetic plate, the relative permeability constant $\mu_r$ ($=\mu_r'-j\mu_r''$) is necessary to be considered. It is concluded in reference 3 that higher real part $\mu_r'$ and lower imaginary part $\mu_r''$ is advantageous in improving antenna efficiency. The relative permeability constant $\mu_r$ of the samples A-D with the thickness of 5 mm are listed in Table 2 below. The frequency of the electromagnetic wave is 900 MHz. The relative dielectric constant $\epsilon_r$ of the samples A-D is (1-j0), as described in the reference 3.

TABLE 2

| Sample | $\epsilon_r'$ | $\epsilon_r''$ | $\mu_r'$ | $\mu_r''$ |
|---|---|---|---|---|
| A | 1 | 0 | 2.00 | 1.00 |
| B | 1 | 0 | 3.20 | 1.50 |
| C | 1 | 0 | 4.60 | 2.80 |
| D | 1 | 0 | 6.28 | 0.76 |

In order to show that the way to obtain the characteristic line K of the dielectrics is applicable to the magnetics, the relative permeability constants according to the samples A-D of reference 3 is plotted in the graph shown in FIG. 7. The thickness of the magnetic material is 5 mm, and the frequency of the electromagnetic wave is 900 MHz. In the graph of FIG. 7, the horizontal axis indicates the real part $\mu_r'$ of the relative permeability constant, and the vertical axis indicates the imaginary part $\mu_r''$. The characteristic curves $K_1$, $K_2$, $K_3$, $K_4$ respectively indicate the combination of the real part $\mu_r'$ and the imaginary part $\mu_r''$ to take the relative antenna efficiency of "1.0", "10% lower", "20% lower" and "30% lower".

FIG. 7 shows that the antenna efficiency of the samples A-C is lower by 10% to 20% than the sample D. Table 3 shows the evaluation result of the samples A-D described in reference 3. Since the result in Table 3 below is similar to the result in FIG. 6, it is found that the way to obtain the characteristic line K of the dielectrics is applicable to the magnetics.

TABLE 3

|  | Sample A | Sample B | Sample C | Sample D |
|---|---|---|---|---|
| Antenna Efficiency | about 85 | about 85 | about 85 | 100 |
| Absorbed Power | 42 | 67 | 100 | 24 |

The absorbed power in the above table indicates a phantom absorption power corresponded to SAR. In the relative permeability constant table of FIG. 7, on the other hand, the phantom absorption powers of the samples A-D are 43, 60, 100, 31, respectively. These results are similar to each other.

Next, in order to show that the dielectric sheet can decrease the thickness and achieve the object of the present invention, the dielectric sheet according to this embodiment is compared with the samples S1, S2 as recited in the reference 2.

FIG. 8 shows the transmittance, to electromagnetic wave having the frequency of 900 MHz, of the samples S1 ($\epsilon_r$=10-j10), S2 ($\epsilon_r$=20-j20) according to reference 2, and the transmittance of the dielectrics X ($\epsilon_r$=288-j124) according to this embodiment. The relative dielectric constant of the samples S1, S2 belong to the region I of FIG. 3, whereas the relative dielectric constant of the dielectrics X belongs to the region II. Although smaller transmittance is preferable for the purpose of reducing SAR, the thickness of the samples 1, 2 need to be 2.8 mm, 1.4 mm respectively, to reduce the transmittance to 0.4. On the other hand, the thickness of the dielectrics X according to this embodiment is only about 0.1 to 0.2 mm to obtain similar transmittance.

The reason that thin dielectrics X can reduce the transmittance, compared with the samples S1, S2, is that the dielectrics X has a large square root ($\sqrt{(\epsilon_r \times \mu_r)}$) of the product of relative dielectric constant and the relative permeability constant. A large square root will increase compression effect of the wavelength. Based on the similar reason, it is considered that the dielectrics X according to this embodiment can reduce the width and length as well as the thickness in order to obtain the same effect.

The reflectivity to electromagnetic wave of the samples S1, S2 and the dielectrics X is shown in FIG. 9. The horizontal axis takes the thickness d of the samples S1, S2 and the dielectrics X. In the graph of FIG. 9, the reflectivity of 1.0 indicates complete reflection. Although the dielectrics X according to this embodiment with the thickness of 0.5 mm can realize the reflectivity of 0.5, it is not possible to obtain the same reflectivity by use of the samples S1, S2 even though the thickness is 5 mm. It is clear that the material with high reflectivity, such as the dielectrics X, is advantageous in reducing SAR and improving antenna efficiency. In order to improve the reflectivity, the absolute value of Z ($=\sqrt{(\mu_r/\epsilon_r)}$) needs to be much larger than 1.0. From this perspective, the dielectrics X according to this embodiment is advantageous than the samples S1, S2.

In terms of increasing the ratio of the numerator $\mu_r$ to the denominator $\epsilon_r$, the magnetics like those described in the references 1 and 3 may be also utilized. The relative dielectric constant $\epsilon_r$ of the magnetics becomes larger than 1.0. In sharp contrast, it is possible to realize the relative permeability constant $\mu_r$ of 1.0 by preventing a magnetic material to be added to the dielectrics. Thus, in terms of improving the reflectivity to electromagnetic wave, a dielectrics is preferable to a magnetics.

For instance, in the event of utilizing the magnetic sample D ($\mu_r$=6.28−j0.76) recited in the reference 3, the absolute value of Z ($=\sqrt{/(\mu_r/\epsilon_r)}$) becomes about 2.52 if the relative dielectric constant $\epsilon_r$ is 1.0. In that case, the sample D may be able to reflect some electromagnetic wave. But if the relative dielectric constant $\epsilon_r$ takes the value of 6.28−j0.76, for instance, the absolute value Z becomes 1.0, and reflection of electromagnetic wave would not be expected. The magnetics tends to have a relative dielectric constant larger than 1.0, it is preferable to utilize the dielectrics rather than the magnetics for the purpose of improving the reflectivity to electromagnetic wave.

FIG. 10 shows the graph of absorption rate, in function of the thickness d, of the dielectrics X and the samples S1, S2. A large absorption rate is advantageous in reducing SAR, but not advantageous in antenna efficiency. In order to increase the absorption rate, the samples S1, S2 needs to be thicker. On the other hand, it is possible to adjust the absorption rate of the dielectrics X under the condition that the thickness d is small. Therefore, the dielectrics X according to this embodiment is preferable in adjusting the characteristics more flexibly, in consideration of the transmittance, reflectivity, absorption rate and the combination thereof.

EXAMPLES

Next, examples of the dielectrics applicable to the portable telephone will be explained. As listed in Table 4 below, the examples 1-3 have a silicon rubber as the base material, and graphite fiber and several kinds of additives are included. Among the materials in the following table, the graphite fiber and the conductive carbon are mixed in the base material as the conductive materials. The dry silica is mixed as the inductive material. The silicone oil and the organic peroxide respectively work as the softening agent and the cross-linking agent. Note that the part by weight "0" indicates that no additive is added.

TABLE 4

| Material | | Example 1 | Example 2 | Example 3 |
|---|---|---|---|---|
| Silicone rubber | | 100 | 100 | 100 |
| Graphite fiber | | 100 | 50 | 50 |
| Conductive carbon | | 0 | 10 | 7 |
| Dry silica | | 0 | 0 | 3 |
| Silicone oil | | 10 | 10 | 10 |
| CaO | | 10 | 10 | 10 |
| Organic peroxide | | 0.5 | 0.5 | 0.5 |
| Relative dielectric constant (900 MHz) | $\epsilon_r'$ | 288 | 335 | 197 |
| | $\epsilon_r''$ | 124 | 656 | 226 |

Unit: Part by weight

Each of the materials in Table 4 corresponds to the following product and manufacturer/seller.

| Silicone rubber | DY32-152U |
| | (Dow Corning Toray Silicone Co., Ltd.) |
| Graphite fiber | MGII 244 |
| | (Osaka Gas Chemicals Co., Ltd.) |
| Conductive carbon | Ketjenblack EC600JD |
| | (Kao Corporation) |
| Dry silica | Aerosil 200 |

-continued

| | |
|---|---|
| | (Nippon Aerosil Co., Ltd.) |
| Silicone oil | SH200cv110cs |
| | (Dow Corning Toray Silicone Co., Ltd.) |
| CaO | VESTAPP |
| | (Inoue Lime Industrial Co., Ltd.) |
| Organic peroxide | RC-4 (50P) |
| | (Dow Corning Toray Silicone Co., Ltd.) |

The dielectric sheets according to the examples 1-3 are in the form of the dielectric sheet having the size of 0.5 mm×40 mm×110 mm. The dielectric sheet is manufactured by the following processes. First, the materials selected for each of the examples 1-3 are contained into an open roll in which the materials are mixed under a room temperature (25° C.) to form a mixture. Then, certain amount of the mixture is injected in a gap between a pair of mold. The gap between the molds is kept 0.5 mm during pressurization process. The mixture between the molds is pressurized at 170° C. for 10 minutes (pressure: 180 Kgf/cm$^2$) to form a molded sheet having the thickness of 0.5 mm. The molded sheet is then cut into the dielectric sheets, each of which has the size of 40 mm by 110 mm.

The real part $\epsilon_r'$ and the imaginary part $\epsilon_r''$ of the complex relative dielectric constant of the dielectric sheets according to examples 1-3 are listed in the above table. The coordinates according to the examples 1-3 are located in the outer region of the characteristic line K in FIG. 3, and thus, these examples are suitable for the dielectrics in order to improve antenna efficiency and reduce SAR of the portable telephone. Moreover, such dielectric is advantageous in productivity because the dielectrics is manufactured from easily available raw materials.

The composition of the dielectrics that is preferably incorporated in the portable telephone is not limited to those described examples 1-3. For instance, other materials such as epoxy resin, olefin resin, olefinic thermoplastic elastmer and styrene elastmer, may be used as the base material of the dielectric sheet. Other examples of the conductive material are carbon fibers with appropriate length (about 700 μm) and scaled graphite with the diameter of 20 μm. It is possible to use alumina powder and wet silica as the non-conductive materials to be added to the base material.

The present invention is applicable to various types of portable telephones as well as the one described in the above embodiment. For instance, the dielectric sheet may have similar effect to various kinds of antennas other than the whip antenna described in the above embodiment, as long as the dielectric sheet extends between the human head and electromagnetic wave source like the antenna and the oscillation circuit. Examples of other types of antennas are a chip antenna mounted on a circuit board that is used without pulling out of the housing, a built-in antenna (so-called a reverse F antenna). The dielectric sheet is also applicable to a foldable portable telephone in which the receiver unit and the mouthpiece unit are faced to each other when folded. Although the dielectric sheet is attached to the inner surface of the housing in the above embodiment, it is possible to fix the dielectric sheet to other positions, such as the circuit board, inner surface of the display panel (LCD). It is also possible to utilize the dielectric sheet as a shield case.

Since the thin dielectric sheet according to the present invention increases the density of circuit elements in the potable telephone, it is possible to reduce the size of the portable telephone, save the materials (resources) for the dielectrics, and improve the communication condition.

Moreover, since the dielectric sheet according to the present invention can improve the antenna efficiency, it is possible to reduce the output power in communication, and thus to extend the life of the battery.

Various changes and modifications are possible in the present invention and may be understood to be within the scope of the present invention.

What is claimed is:

1. A portable telephone including a mouthpiece portion, an earpiece portion and an antenna, the mouthpiece portion and the earpiece portion inputting and outputting sounds for communication, the antenna emitting electromagnetic wave for communication, the portable telephone comprising:

a sheet-type dielectrics provided in a position apart from the antenna, the dielectrics having the thickness of 1 mm or smaller, and the dielectrics having the relative dielectric constant $\epsilon_r$ that is defined as $(\epsilon_r' - j\epsilon_r'')$, the combination of the real part $\epsilon_r'$ and the imaginary part $\epsilon_r''$ being outside of the characteristic line K shown in FIG. 4, and the imaginary part $\epsilon_r''$ being equal to or more than one, wherein said sheet-type dielectrics includes a base material and an additive containing graphite fiber.

2. The portable telephone according to claim 1, wherein antenna efficiency when the dielectrics is not provided is defined as AEFF(0), antenna efficiency when the dielectrics is provided is defined as AEFF(A), and an AEFF relative value is defined as AEFF(A)/AEFF(0);

wherein the real part $\epsilon_r''$ and the imaginary part are combined such that the AEFF relative value is more than one in a frequency range used by the portable telephone.

3. The portable telephone according to claim 1, wherein the dielectrics is located near the antenna and in the mouthpiece portion side with respect to the antenna.

4. The portable telephone according to claim 3, further comprising a housing to contain the mouthpiece portion, the dielectrics being attached to the inner surface of the housing.

5. The portable telephone according to claim 1, wherein the dielectrics is located near the antenna and in the earpiece portion side with respect to the antenna.

6. The portable telephone according to claim 5, further comprising a housing to contain the earpiece portion, the dielectrics being attached to the inner surface of the housing.

7. The portable telephone according to claim 1, wherein the dielectrics is located between the antenna and a user's body at the time when the portable telephone is used by the user.

8. The portable telephone according to claim 1, wherein the base material of the dielectrics is a resin, a rubber or an elastmer, and the relative dielectric constant is adjusted by adding dielectric materials and/or conductive materials.

9. The portable telephone according to claim 1, wherein the sheet-type dielectrics is free of any magnetic layer.

10. The portable telephone according to claim 1, wherein said additive further contains carbon powder.

11. The portable telephone according to claim 1, wherein said sheet-type dielectrics further includes a softening agent containing silicone oil.

* * * * *